July 28, 1936.　　　　　A. KREMSER　　　　　2,048,936
TANK FILLING DEVICE
Filed Dec. 6, 1933　　　3 Sheets-Sheet 1
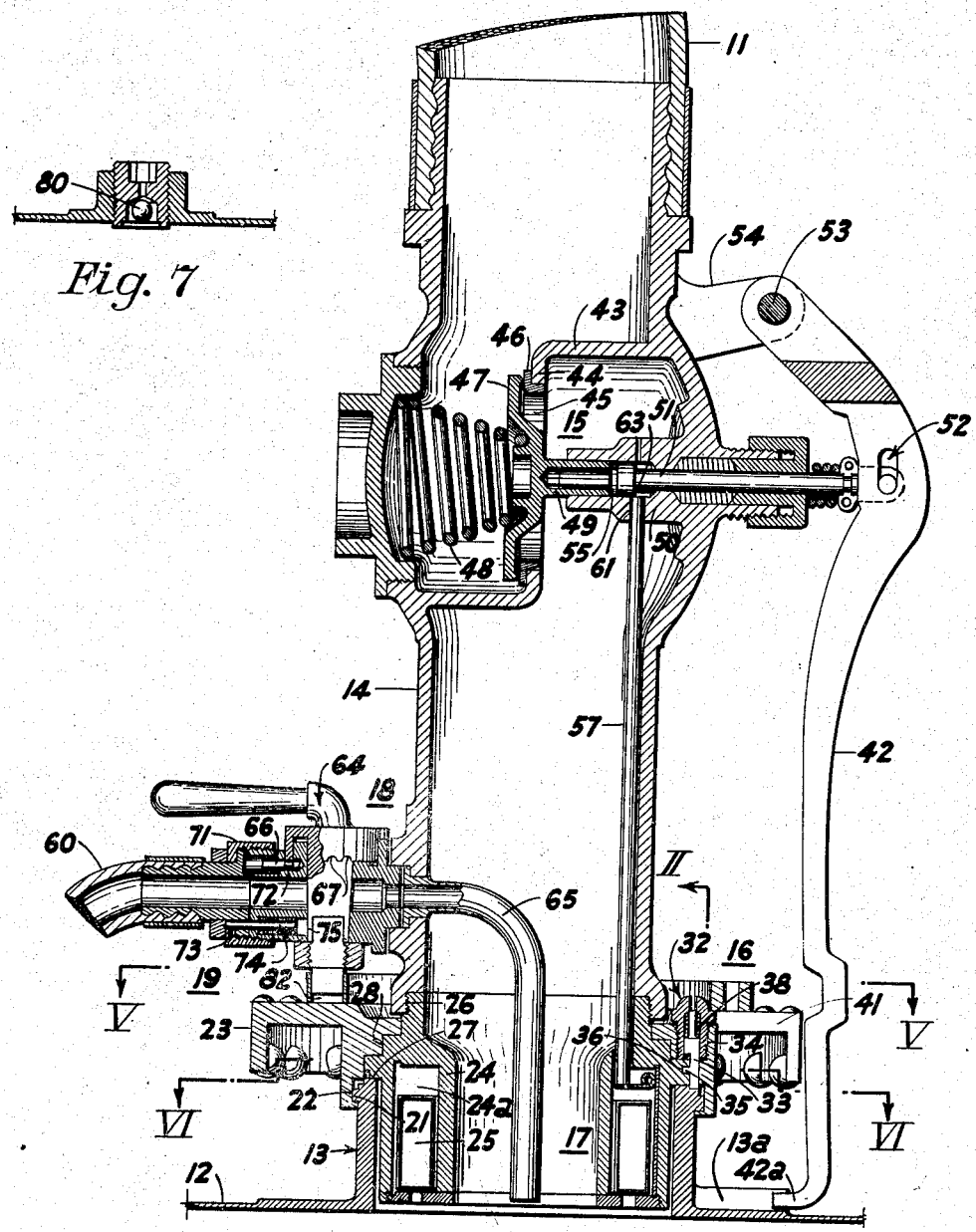
Fig. 7
Fig. 1
Inventor
Alois Kremser
by 
Attorney Inventor
Alois Kremser
by J. H. Adams
Attorney July 28, 1936.  A. KREMSER  2,048,936
TANK FILLING DEVICE
Filed Dec. 6, 1933  3 Sheets-Sheet 3

Inventor
Alois Kremser
by *Attorney*

Patented July 28, 1936

2,048,936

UNITED STATES PATENT OFFICE 2,048,936

TANK FILLING DEVICE

Alois Kremser, Berkeley, Calif., assignor to Standard Oil Company of California, San Francisco, Calif., a corporation of Delaware Application December 6, 1933, Serial No. 701,101

15 Claims. (Cl. 226—22)

This invention relates to a tank filling device and more particularly, but not necessarily, to a device for transferring volatile fluids from one liquid vehicle to another liquid vehicle.

The present device is adaptable for use wherever it may be desired to connect any vehicle of liquid, fluid or the like with another vehicle. The present device is particularly, but not necessarily, adaptable for use in dispensing of gasoline from an elevated container, such as those used at gasoline service stations, into the tank of a gasoline motor propelled vehicle. In addition to the desirability of a device for preventing the wasting and spilling of the gasoline during the filling operation, it is also of great importance to avoid such wasting and spilling, due to the volatile nature of the gasoline and the fire hazard resulting from such wasting or spilling thereof. It is very difficult, especially for those unskilled in the trade to predetermine the exact amount of fuel required to fill a tank. Aside from this, the overfilling of a tank is often due to negligence on the part of the operator or faulty tank gauges, the latter being more or less slow in recording the exact amount within the tank. The present device is also particularly adapted for use with those types of stations known as self-service stations, where the customer is encumbered with the duty of filling his own tank.

It is one object of this invention to provide a novel device for transferring fluids from one vehicle to another vehicle that shall positively prevent the loss or spilling of such fluids during the transferring operation.

Another object is to provide a tank filling device for use in transferring a liquid from one container to another that shall positively prevent the spilling of such liquid due to the overfilling of the last said container.

Another object is to provide a novel device for connecting a hose or conduit with another hose or conduit or with a complementary member such as the intake of a tank that will automatically prevent the connecting or disconnecting of the device when such connecting or disconnecting would result in the loss or spilling of fluid from the device or from the members being connected.

Another object is to provide a tank filling device having the above characteristics that will automatically prevent its disconnection from a container when the liquid contents of the latter exceed a predetermined amount.

Another object is to provide a combined valve and coupling device wherein the operation of the said valve and said coupling device is dependent upon the relative positions of each other.

Another object is to provide a device having the above characteristics, that will preclude the operation of the valve so long as the device in its entirety is not in fixed operable relation with both the supply vehicle and receiving vehicle.

Another object is to provide a novel device for connecting a hose or conduit with the intake of a tank that will be responsive to the fluid within said tank for preventing the disconnecting of the device from the tank when the tank contains more than a predetermined amount of fluid.

Another object is to provide a device having the above characteristics, having a novel drain mechanism for drawing off excess fluids, the operation of which is dependent upon the device being in fixed operable relation with the tank being filled.

A still further object is to provide a novel coupling device including a valve for connecting a hose or conduit with a complementary member, that is of such structure as to prevent its misuse so as to render it practical for use by unskilled persons.

A still further object is to provide a device having the above characteristics that is novel in structure, durable, simple and positive in operation and comparatively cheap to manufacture.

The accomplishment of the above and other objects will be apparent to those skilled in the art from the following description when taken in connection with the accompanying drawings wherein like reference characters refer to like parts. It is to be expressly understood that the drawings are not a definition of the invention but merely show one form of a device embodying the principles of the invention and illustrating one manner in which the invention may be carried out. The scope of the invention is defined by the appended claims.

In the drawings:

Figure 1 is a vertical sectional view of a device embodying the invention.

Figure 7 is a sectional view of a float operated vent employed with the tank or container to be filled.

Figure 4:
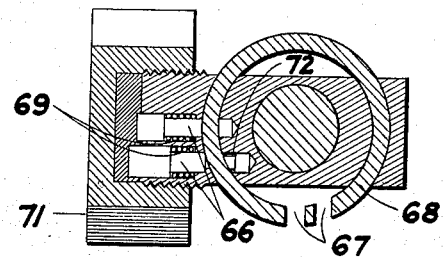
Figure 4 is a sectional view taken along the line IV—IV of Figure 3.

In the form shown, the present device is illustrated in connection with the ordinary gasoline hose or vehicle indicated by 11 and a conventional automobile tank indicated in part at 12, the present device comprises a coupling receptacle member or vehicle represented in its entirety by 13, an elongated tubular body member 14, a valve mechanism represented in its entirety by 15, means represented in its entirety by 16 for connecting the body member 14 with the receptacle member 13, interlocking means represented in its entirety by 17 for interlocking the valve mechanism 15 with the connecting means 16, a drain means represented in its entirety by 18 and an interlocking means represented in its entirety by 19 for governing the operation of the drain means 18 in accordance with the position of the connecting means 16.

The coupling receptacle member 13 is here shown as an integral part of the tank 12 and forming the tank intake. However the member 13 may be separate from the tank 12 and provided with means for connecting it to the intake of the tank. The receptacle member 13 is provided adjacent its upper end with an external thread 21 for engaging and cooperating with a complementary thread 22 provided within the connecting means 16. The connecting means 16 may be in the form of a hand wheel 23 and of sufficient size to provide a convenient grip for an operator's hand. The tubular body portion 14 of the coupling is provided at its lower end with a reduced portion 24 adapted to fit within the member 13. This portion 24 is constructed to form an annular chamber 24ᵃ for accommodating an annular float 25, the purpose of which will be later described. The reduced portion 24 may be an integral part of the body member 14 or for manufacturing purposes it may be constructed separately and fixed to the lower end of the member 14 by threaded means 26 as shown. However, for the purpose of disclosing the present device, the member 24 will be considered an integral part of the body 14.

Figure 2:
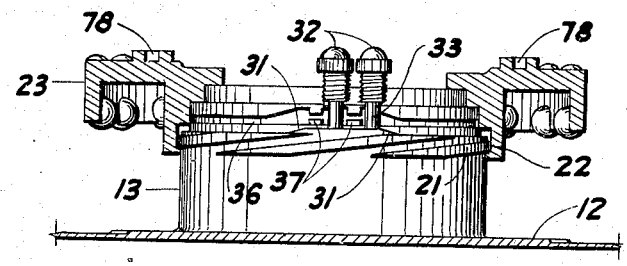
Figure 2 is a fragmental sectional view taken along the line II—II of Figure 1.
Figure 3:
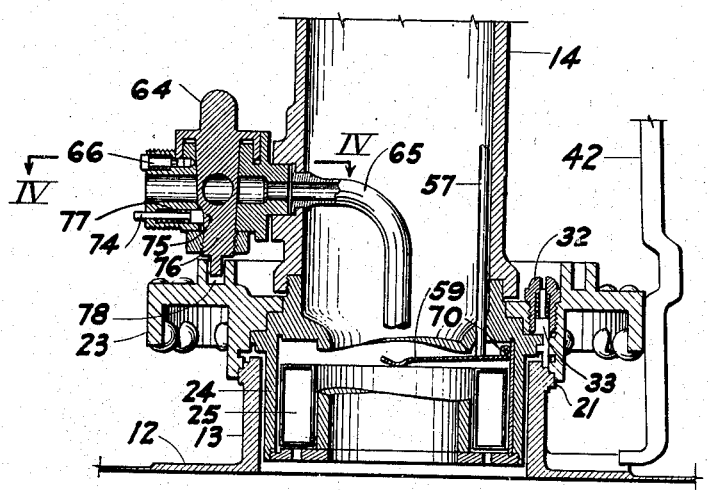
Figure 3 is a fragmental sectional view of the device having a portion broken away in order to illustrate the novel float mechanism embodying the invention.
Figure 5:
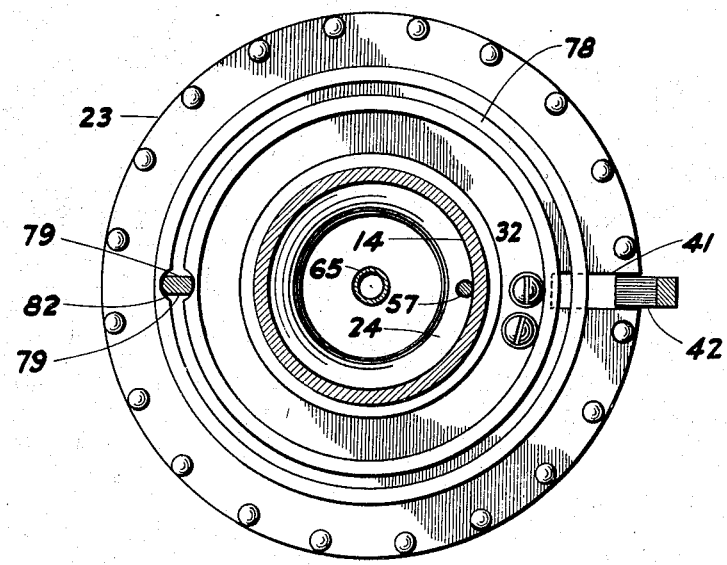
Figure 5 is a sectional view taken along the line V—V of Figure 1, showing the connecting means of the coupling in assembled operable relation with the complementary coupling member.
Figure 6:
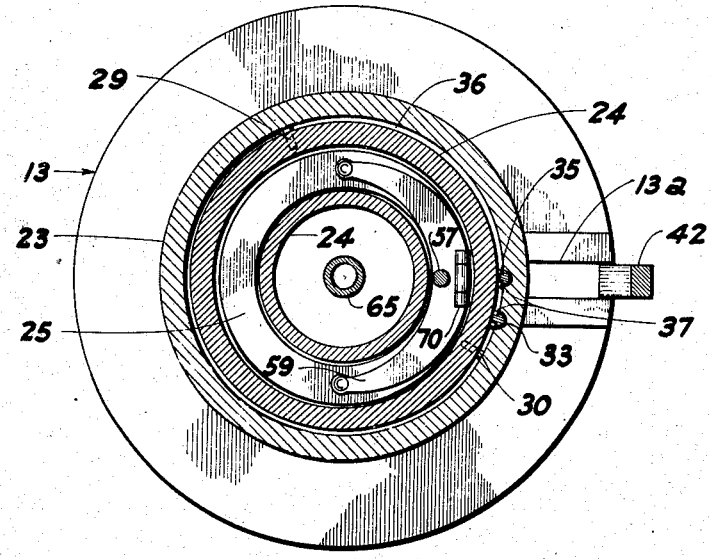
Figure 6 is a sectional view similar to Figure 5 taken along the line VI—VI of Figure 1.

The reduced portion of the body 14 provides a shoulder 27 for abutting against the peripheral end face of the member 13. The hand wheel 23 is turnably mounted on the body portion 14 as shown at 28, but is limited in its turning movement by stop members 29 and 30 (see Figure 6) the purpose of which will later be described. The peripheral face of the member 13 is also provided with a cam portion 31 (see Figure 2) for actuating an interlocking means 32. The interlocking means 32 are positioned in vertical openings 34 provided in the body of the hand wheel 23 and consist of a pair of spring held stud members 33. Each of the members 33 is provided adjacent its lower end with an inwardly extending projection 35. The projections 35 are positioned within and adapted to move along a groove 36 provided in the body member 14 and are adapted to cooperate with stop members 37 for preventing the turning of the hand wheel 23 to locked or closed position so long as the member 14 is disconnected from the receptacle member 13. The stop members 29 and 30 above mentioned are positioned in groove 36 as shown in Figure 6 and are also adapted to cooperate with the projections 35 for defining the open position of wheel 23 and limiting the clockwise movement of the latter.

When the members 13 and 14 are in alined connecting position the cam face 31 operates to urge the members 33 upwardly against the tension of the springs 38 for permitting the projections 35 on the member 33 to pass over the stop members 37 in order that the hand wheel 23 may be turned to closed position. The purpose of the interlocking members 33 is to prevent the opening of the valve 15 so long as the coupling members 13 and 14 are not in connected relation. This is effected by means of a recess 41, provided in the periphery of the hand wheel 23 for receiving a cooperating portion of a valve actuating handle 42 when the hand wheel is in closed connected position with member 13. It can therefore be seen that in the absence of the cam face 31 to move the members 33 upwardly and free to pass the stop members 37, that the hand wheel cannot be turned to closed position and since the hand wheel must be in closed position so that the recess 41 will be positioned to receive the valve actuating handle 42, that the valve 15 is prevented from being opened so long as the members 13 and 14 are not in connected operable relation.

The valve mechanism 15 consists of a partition 43 within the body member and disposed intermediately thereof. The partition 43 is formed to provide a vertical portion 44 through which a valve port 45 is formed. The port 45 may be provided with a non-metallic member 46 for forming a valve seat for a valve 47. The valve 47 is normally held and biased towards closed position by a spring means 48. The valve stem 49 is slidably mounted in the inner end of a tubular boss 50 provided up on the wall of the body 14 and adapted to cooperate with a valve push rod 51 also carried by the tubular boss 50. The outer end of the rod 51 is operably connected with the actuating handle 42 in any suitable manner such as shown at 52. The upper end of the actuating handle 42 is turnably mounted by means of a shaft 53 supported on projections 54 carried by the body member 14. It is now clear that upon turning the handle 42 clockwise about the shaft 53 that the rod 51 will be urged inwardly and move the valve 47 against the tension of the spring 48 to open position. In order to provide flexibility in actuating the valve 47, a small space 55 in front of the rod 51 is provided for permitting a limited relative inward movement of the rod 51 with respect to the valve stem 49.

In order to prevent operation of the hand wheel 23 when tank 12 is overfilled, the float member 25 is adapted to operate a rod 57 for interlocking the valve push rod 51 with the boss 50. This prevents counter-clockwise movement of the handle 42 about the shaft 53 and retains the handle 42 in interlocking relation with the recess 41 within the hand wheel 23 preventing the operation of the latter until the liquid in the tank has been withdrawn sufficiently to lower the float 25, after which time the handle 42 may be removed from interlocking relation with the recess 41 and permitting the operation of the hand wheel 23.

The float 25 may be operably connected with the lower end of the rod 57 by means of a U-shaped lever 59. The center of the U-shaped lever 59 may be hingedly connected with the inner walls of the float chamber 24 as shown at 70 and its free ends resting upon corresponding portions of the float 25. The upper end of the rod 57 extends through an opening 61 in the boss 50 provided on the wall of the body 14 for supporting the valve push rod 51. The valve push rod 51 is provided with a head portion 63 for actuating the valve stem 49, and when the rod 57 is pushed upwardly by the float 25 the upper end of the rod 57 will lie in the path of the head portion 63 on the push rod 51, preventing the releasing of the handle 42 from engagement with the notch 41 within the wheel 23.

The novel drain mechanism 18 is provided for drawing off excess fluid from the tank and the associated coupling members. The drain mechanism may comprise a conventional petcock 64, including certain modifications later to be described. The petcock 64 may be carried by the wall of the body 14 and has associated therewith and extending inwardly and downwardly of the body 14 a drain pipe 65. A drain hose 60 is provided for connecting with the cock 64 and in order to prevent opening cock 64 unless the drain hose 60 is connected to the cock 64, a pair of interlocking pins 66 are disposed in openings provided in the outer end of the cock 64 and adapted to cooperate with notches or recesses 67 provided in a skirt 68 carried by and movable with the cock 64 during the latter's opening and closing movement (see Figure 4).

The pins 66 are held outwardly by means of springs 69 when the hose 60 is disconnected. The hose 60 may be connected by the means of a union 71, the inner face of which will engage the outer ends of the pins 66 and urge them inwardly sufficiently to cause recesses 72, provided adjacent the inner ends of the pins 66 to register with the skirt 68 and permit the cock 64 to be turned to open position (see Figure 1). Means is also provided for preventing the disconnecting of the hose 60 so long as the cock 64 is in open position, which means consist of a spring held pin 74 also carried by the receiving end of the cock 64 and actuated by a cam portion 75 provided on the cock stem 76. The pin 74 is biased inwardly by means of a spring 77 against the cooperating portion 75 of the cock stem 76. Upon turning the cock 64 to open position the pin 74 is moved outwardly and into a cooperating recess 73 provided in the lower inner face of the union nut 71 and locking the union nut with the cock.

Means is also provided for preventing the opening of the cock 64 unless the coupling members 13 and 14 are in connected or closed position, which means consists of annular projections provided on the upper face of the wheel 23 and presenting an annular groove 78 for receiving the lower end of the cock stem 76. The lower end of the cock stem 76 provided with diametrically oppositely disposed flat faces 79 presenting portions of different width. The flat faces 79 permit the lower end of the cock stem 76 to move freely along the groove 78 when the cock 64 is in closed position and preventing the opening of the cock 64, except when the wheel 23 is in connected position with the member 13. At this position the groove 78 is enlarged as shown at 82 for permitting the cock stem 76 to be turned and thereby locking the hand wheel 23 in closed position so long as the cock 64 is in open position.

The operation of the device is as follows:

With the hand wheel 23 in its extreme counterclockwise position as indicated by engagement of the projection 35 with the stop 29, the body member 14 is positioned in alinement with the receiving member 13 and in order that this position may be readily determined, the member 13 is provided with index slot 13ᵃ for receiving an inwardly turned portion of 42ᵃ terminating the lower end of handle 42. The hand wheel 23 is then turned clockwise until the projections 35 on the interlocking pins 33 come in contact with the stop members 37. At this point, the cam face 31 on the member 13 operates to urge the pins 33 upwardly and permitting them to pass the stop members 37 for completion of the setting of the wheel 23. The wheel 23 is then turned until the slot 41 registers with the handle 42. This permits the handle 42 to be turned inwardly or clockwise about the shaft 53 for opening the valve 15.

Should the tank be overfilled, the float mechanism will operate to lock the valve handle and wheel 23 together and prevent the disconnecting of the hose from the tank. This is done by means of the rod 57 being raised upwardly by the means 17 and interlocked with the valve push rod 51 and boss 58.

In order to remove the excess fluid from the tank, it then becomes necessary to connect the hose 60 which is supplied with reduced pressure, to the cock 64. In making this connection, the union nut 71 operates to disconnect the pins 66 from engagement with the skirt 68 carried by the cock 64, after which time the cock 64 may be turned to open position, the hand wheel being in closed position and the lower end of the cock stem 76 registering with the enlarged groove portion 82. After the excess amount has been withdrawn from the tank 12, the petcock may be closed for permitting the turning of the hand wheel 23 to disconnect the device from the tank. After the cock 64 has been closed and releasing the pin 74 from connection with the union nut 71, the drain 60 may be disconnected from the cock if desired.

The tank 12 is provided with a vent, represented in its entirety by Figure 7, for the conventional purpose. The vent includes a float valve 80 adapted to close the vent when the tank is completely filled.

Accordingly, there is provided a tank filling device for use in transferring fluids from one vehicle to another which precludes any possibility of spilling the fluid through either intent or negligence.

While I have illustrated and described but one embodiment of the invention, it will be apparent to those skilled in the art that various changes, modifications, substitutions, additions and omissions may be made in the structure illustrated, without departing from the spirit and scope of the invention as defined by the appended claims.

I claim:

1. A device including a pair of complementary members, a valve, a side drain from one of said members, means movable relative to said members for connecting said members, said means adapted to render said valve and said drain inoperable so long as said members are not in fixed connected relation.

2. A device in accordance with claim 1, wherein said drain has an open position and a closed position and another means responsive to the position of said drain and selectively engaging said connecting means for rendering said connecting means inoperable so long as said drain is in open position.

3. A device including a pair of complementary members, means movable relative to said members for connecting said members in fixed relation, a valve, means for actuating said valve, a side drain from one of said members, means for operating said drain, the operation of the last two said means being under control of the first said means.

4. A device including a pair of complementary members, means movable relative to said members for connecting said members in fixed operable relation, a valve, means for actuating said valve, the first said means adapted to render the second said means inoperable so long as said members are not in fixed operable relation, another means operable for rendering the first said means inoperable when said members are in fixed operable relation, a side drain associated with one of said members, and means for operating said drain, said means being operable only when said connecting means is in fixed operable relation.

5. A tank filling device for connecting a hose with the intake of a tank to be filled with a liquid, comprising a member carried by said hose, a complementary member carried by the intake of said tank, means for connecting said members, and a liquid actuated means for preventing the operation of said connecting means when said tank is supplied with more than a predetermined amount of liquid.

6. A device in accordance with claim 5, wherein a valve is associated with one of said members, and means for actuating said valve, said means being under the control of said liquid actuated means when said tank is supplied with more than a predetermined amount of liquid.

7. A connecting device including a pair of complementary members, means movable relative to said members for connecting said members, said means having an open position and a closed position, and means dependent upon the relative positions of said members for controlling the movement of the first said means to one of said positions.

8. A connecting device including a pair of complementary members, means for connecting said members in operable fixed relation, said means being movable relative to said members, a valve associated with one of said members, and means for rendering said valve operable, the last said means dependent upon said members being in fixed operable relation.

9. A connecting device including a pair of complementary members having a passageway therethrough, a drain leading out of said passageway, and means for rendering said drain inoperable so long as said members are not in fixed operable relation, said last named means including means for connecting said members in fixed operable relation.

10. A device of the character described including a pair of complementary members, means carried by one of said members turnable thereon for connecting said members, the said means having an open position and a closed position, and means dependent upon the relative positions of said members for permitting the first said means to be moved to one of said positions.

11. A device in accordance with claim 10, wherein the last said means includes a cam face carried by one of said members for actuating a resilient means carried by the other of said members.

12. A connecting device including a pair of complementary members, means for connecting said members, said means being movable with respect to both of said members, a stop member carried by one of said members and defining an open position for said connecting means, a valve having an actuating handle, a recess in said connecting means adapted to register with said valve handle and defining a closed position for said connecting means and means intermediate the open and closed positions of said connecting means for preventing movement of said connecting means to one of said positions so long as said members are not in aligned operable position.

13. A device in accordance with claim 12, wherein the last said means includes a means carried by each of said members.

14. A device in accordance with claim 12, wherein a drain is associated with one of said members and means including said connecting means for rendering said drain inoperable so long as said members are not in fixed operable relation.

15. A tank filling device connecting a conduit with the intake of a tank to be filled with a liquid comprising a member carried by said conduit, a complementary member carried by the intake of said tank, means for connecting said members, a drain for said tank, means for operating said drain, a valve associated with said conduit, means for operating said valve, and means including said connecting means for controlling the operation of said drain operating means and said valve operating means.

ALOIS KREMSER.